US011440180B2

(12) United States Patent
Vangal Ramamurthy et al.

(10) Patent No.: US 11,440,180 B2
(45) Date of Patent: Sep. 13, 2022

(54) ROBOTIC APPARATUS

(71) Applicant: OMRON Corporation, Kyoto (JP)

(72) Inventors: Swaminathan Vangal Ramamurthy, Singapore (SG); Raja Nagarajan, Singapore (SG); Shinya Komori, Nagoya (JP)

(73) Assignee: OMRON Corporation, Kyoto (JP)

(*) Notice: Subject to any disclaimer, the term of this patent is extended or adjusted under 35 U.S.C. 154(b) by 122 days.

(21) Appl. No.: 16/754,141

(22) PCT Filed: Nov. 1, 2018

(86) PCT No.: PCT/IB2018/058570
§ 371 (c)(1),
(2) Date: Apr. 7, 2020

(87) PCT Pub. No.: WO2019/092557
PCT Pub. Date: May 16, 2019

(65) Prior Publication Data
US 2020/0331142 A1    Oct. 22, 2020

(30) Foreign Application Priority Data
Nov. 9, 2017   (SG) ............................ 10201709233T (51) Int. Cl.
*B25J 9/04*       (2006.01)
*B25J 9/00*       (2006.01)
*B25J 5/04*       (2006.01)

(52) U.S. Cl.
CPC ................ *B25J 9/042* (2013.01); *B25J 5/04* (2013.01); *B25J 9/0009* (2013.01); *B25J 9/044* (2013.01)

(58) Field of Classification Search
CPC ...... B25J 5/02; B25J 9/041; B25J 9/042; B25J 9/044
(Continued)

(56) References Cited

U.S. PATENT DOCUMENTS 3,262,593 A    7/1966   Hainer
3,482,711 A    12/1969  Bohme et al.
(Continued)

FOREIGN PATENT DOCUMENTS

CN    204094784    1/2015
CN    104576474    4/2015
(Continued)

OTHER PUBLICATIONS

"Search Report of Europe Counterpart Application", dated Aug. 5, 2021, p. 1-p. 5.
(Continued)

*Primary Examiner* — Joseph Brown
(74) *Attorney, Agent, or Firm* — JCIPRNET (57) ABSTRACT

A robotic apparatus includes a first guide rail; an elongate support attached to the first guide rail, the elongate support being movable along the first guide rail in two directions and rotatable at each position along the first guide rail; a first limb movable along a second guide rail in the elongate support, the first limb being extendable and retractable; a second limb pivotably attached to the first limb; an end effector mount located at the second limb and rotatable at one end of the second limb; and a third guide rail attached to the elongate support to guide movement of the elongate support in the two directions that the elongate support is movable along the first guide rail; and driving mechanisms to drive movements of the robotic apparatus.

15 Claims, 9 Drawing Sheets

(58) Field of Classification Search
USPC .......................................................... 901/17
See application file for complete search history.

(56) References Cited

U.S. PATENT DOCUMENTS

| | | | | |
|---|---|---|---|---|
| 3,834,555 | A | * | 9/1974 | Bennington ......... B25J 15/0052 |
| | | | | 901/17 |
| 4,650,952 | A | * | 3/1987 | Akeel .................. B25J 19/0037 |
| | | | | 219/121.79 |
| 5,606,262 | A | * | 2/1997 | Montalbano ............. B25J 9/041 |
| | | | | 73/866.5 |
| 2008/0253876 | A1 | * | 10/2008 | Sandmeier ............... B25J 9/041 |
| | | | | 414/800 |
| 2013/0017042 | A1 | * | 1/2013 | Tang ........................ B25J 9/041 |
| | | | | 414/225.01 |
| 2015/0375390 | A1 | * | 12/2015 | Becroft .............. B05B 13/0431 |
| | | | | 901/41 |
| 2017/0217013 | A1 | | 8/2017 | Iqtidar et al. |
| 2019/0061542 | A1 | * | 2/2019 | Zhao ..................... H02J 7/0042 |

FOREIGN PATENT DOCUMENTS

| | | | | |
|---|---|---|---|---|
| JP | 2015205330 | A | * 11/2015 | |
| SU | 603577 | A1 | * 4/1978 | .............. B25J 9/023 |
| WO | WO-9951389 | A1 | * 10/1999 | .............. B23Q 1/25 |
| WO | WO-2017153790 | A1 | * 9/2017 | |

OTHER PUBLICATIONS

"International Search Report (Form PCT/ISA/210) of PCT/IB2018/058570," dated Feb. 1, 2019, pp. 1-3.

"Written Opinion of the International Searching Authority (Form PCT/ISA/237) of PCT/IB2018/058570," dated Feb. 1, 2019, pp. 1-6.

Precise Automation, "Preciseflex 400 World's First Collaborative SCARA Robot," Mar. 31, 2017, Available at: http://robotforum.ru/assets/files/Precise_Automation_pdf/PF400_pdf.pdf.

* cited by examiner

ROBOTIC APPARATUS

CROSS-REFERENCE TO RELATED APPLICATION

This application is a 371 application of the International PCT application serial no. PCT/IB2018/058570, filed on Nov. 1, 2018, which claims the priority benefit of Singapore Patent Application No. 10201709233T, filed on Nov. 9, 2017. The entirety of each of the above-mentioned patent applications is hereby incorporated by reference herein and made a part of this specification.

FIELD OF THE INVENTION

The present invention relates to a robotic apparatus, in particular a robotic apparatus for manufacturing articles, assembly of objects, and/or movement of objects, including robotic apparatus having dimensions to fit in a small foot print with limited working or operating space.

BACKGROUND OF THE INVENTION

Cylindrical coordinate robots are robotic apparatuses whose axes form a cylindrical coordinate system. They may be used for assembly operations, handling of machine tools, product electronics testing, item sorting, and handling of biotechnology related processes. However, conventional cylindrical coordinate robots have limited movements and reach, and are not suitable to be implemented on a small scale that requires the robotic apparatus to have dimensions to fit a small footprint and to work within a limited operating space. Cylindrical coordinate robots typically are large size machinery and are implemented on a large scale with dimensions fitting a large footprint.

SUMMARY OF THE INVENTION

In accordance with one aspect of the present invention, there is provided a robotic apparatus comprising:
(a) a first guide rail for guiding movement in two directions;
(b) an elongate support attached to the first guide rail such that the elongate support is movable along the first guide rail in the two directions and rotatable at each position along the first guide rail, wherein the elongate support comprises a second guide rail;
(c) a first limb attached to the second guide rail of the elongate support such that the first limb is movable along the second guide rail, wherein the first limb is extendable and retractable;
(d) a second limb pivotably attached to an end of the first limb such that the second limb is pivotable about the end of the first limb;
(e) an end effector mount attached to an end of the second limb such that the end effector mount is rotatable at the end of the second limb; and
(f) a third guide rail attached to the elongate support to guide movement of the elongate support in the two directions that the elongate support is movable along the first guide rail, wherein the elongate support is rotatable at each position along the third guide rail; and
(g) a plurality of driving mechanisms to drive movements of the elongate support, the first limb, the second limb, and the end effector mount.

The first guide rail and the third guide rail may be attached to each other through a support. The rotation of the elongate support at the position along the first guide rail may be driven by one of the plurality of driving mechanisms and the rotation of the elongate support at the position along the third guide rail may be driven separately by another one of the plurality of driving mechanisms.

The movement of the elongate support along the first guide rail may be driven by one of the plurality of driving mechanisms and the movement of the elongate support along the third guide rail may be driven separately by another one of the plurality of driving mechanisms.

The driving mechanism driving the rotation of the elongate support at the position along the first guide rail may be configured with stronger drive than the driving mechanism driving the rotation of the elongate support at the position along the third guide rail.

The driving mechanism driving the movement of the elongate support along the first guide rail may be configured with stronger drive than the driving mechanism driving the movement of the elongate support along the third guide rail.

The robotic apparatus may have dimensions to fit within a footprint of length 0.5 to 10 m, width 0.45 m to 1 m and height 0.5 m to 3 m.

An end effector attached to the end effector mount may be able to reach within a working space of length 1 m, width 1 m and height 1 m around a part of the robotic apparatus. The first limb may be attached to the second guide rail of the elongate support such that pivoting movement of the second limb in at least one direction is not obstructed by the elongate support.

The elongate support may be rotatable at each position along the first guide rail to an angle such that the first limb and/or the second limb, when extended, do not extend beyond a restricted working space around a part of the robotic apparatus.

The elongate support may be rotatable at each position along the first guide rail to an angle such that the first limb and the second limb including the end effector mount with or without an end effector mounted to the end effector mount, when extended, do not extend beyond a restricted working space around a part of the robotic apparatus.

BRIEF DESCRIPTION OF THE DRAWINGS

Embodiments of the invention will be better understood and readily apparent to one skilled in the art from the following written description, by way of example only and in conjunction with the drawings, in which.

DESCRIPTION OF THE EMBODIMENTS

All the dimensions of the elements present in the Figures of the present disclosure are provided in meters or millimeters and are for illustration purposes only. They merely illustrate the dimensions of examples in the present disclosure. Other suitable dimensions are also possible.

Figure 1:
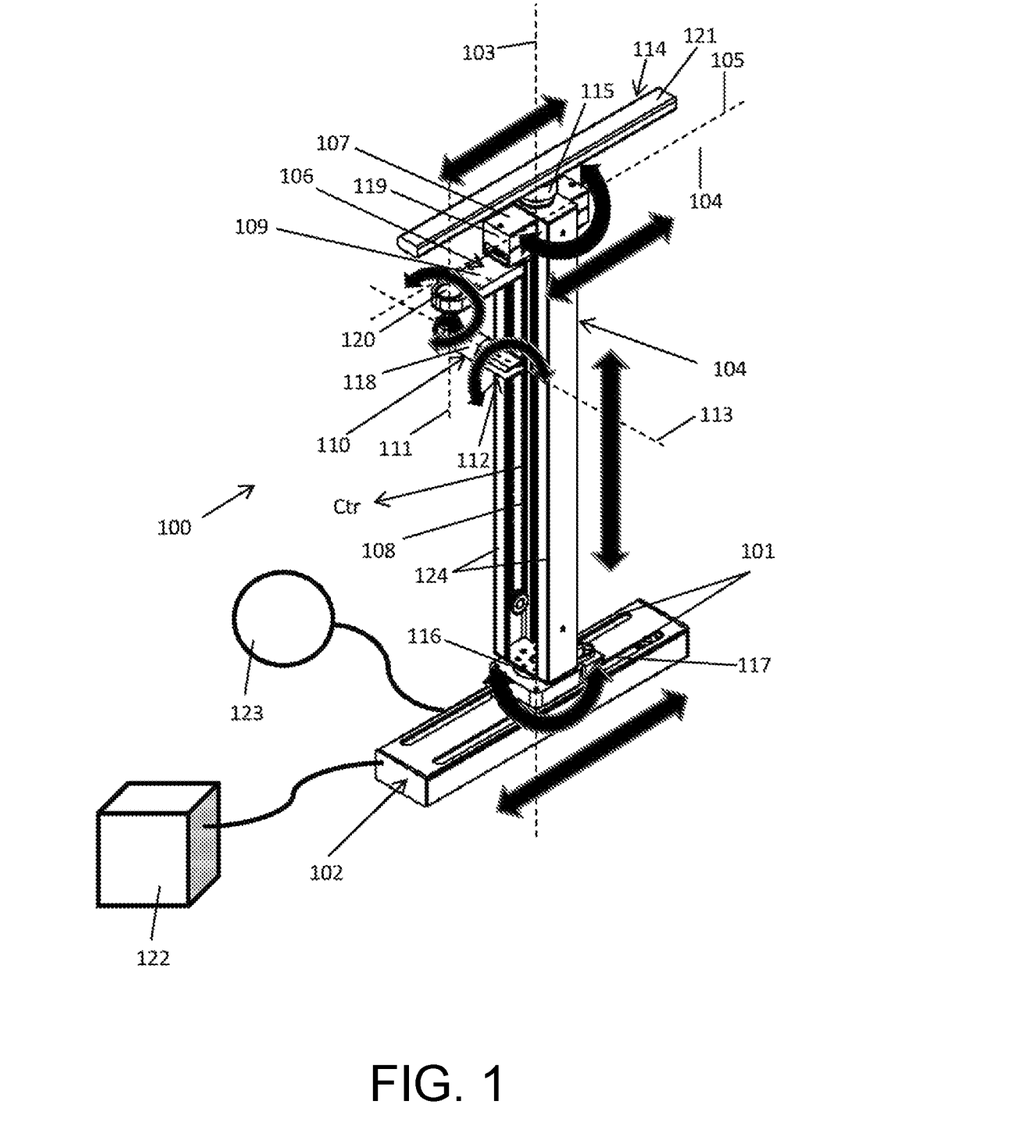
FIG. 1 is a front perspective view of a robotic apparatus according to an example of the present disclosure.

FIG. 1 shows an example of a robotic apparatus 100 comprising a first guide rail 102 for guiding movement in two directions. The robotic apparatus 100 comprises an elongate support 104 having one end attached to the first guide rail 102 such that a longitudinal axis 103 of the elongate support 104 is orthogonal to the two directions. The elongate support 104 is movable along the first guide rail 102 in the two directions. In the present example, the first guide rail 102 comprises two tracks 101 arranged adjacent and parallel to each other for receiving the elongate support 104. It is possible in other configurations that more tracks are used or just one track is implemented. The elongate support 104 is also rotatable about the longitudinal axis 103 of the elongate support 104 at each position along the first guide rail 102. The elongate support 104 comprises a second guide rail 108 extending along the longitudinal axis 103 of the elongate support 104. In the present example, the elongate support 104 is formed by two spaced apart elongate bars 124 and respective ends of the elongate bars 124 are joined together. The second guide rail 108 is located between the elongate bars 124.

The robotic apparatus 100 comprises more than one limbs. There is present a first limb 106 attached to the second guide rail 108 of the elongate support 104 such that the first limb 106 is movable along the second guide rail 108. A longitudinal axis 105 of the first limb 106 is orthogonal to the longitudinal axis 103 of the elongate support 104. The first limb 106 is extendable and retractable in directions along the longitudinal axis 105 of the first limb 106. In the present example, the first limb 106 comprises two parts 107 and 109. The first part 107 of the first limb 106 is attached to the elongate support 104. The second part 109 of the first limb 106 is slidably attached to the first part 107 such that the second part 109 of the first limb 106 is able to slide away from the elongate support 104 to extend, or slide towards the elongate support 104 to retract. Specifically, the second part 109 is configured to slide over an outer surface of the first limb 106. It is possible in other configurations that the first limb 106 comprises more than two such parts to further extend the operation reach of the first limb 106. In other configurations, such parts may be telescopically attached to one another.

The robotic apparatus 100 comprises a second limb 110 pivotably attached to one end of the first limb 106 such that the second limb 110 is pivotable about an axis 111 orthogonal to the longitudinal axis 105 of the first limb 106. Specifically, the second limb 110 is attached to the second part 109 of the first limb 106. A longitudinal axis 113 of the second limb 110 is orthogonal to the longitudinal axis 103 of the elongate support 104. The second limb 110 can be pivoted to a position underneath the first limb 106 such that the longitudinal axis 13 of the second limb 110 is parallel to the longitudinal axis 105 of the first limb 106. In this configuration, the second limb 110 is stowed away under the first limb 106 and the second limb 110 can be moved to another operation location by the extension and retraction of the first limb 106. Once the second limb 110 is brought to the operation location by the first limb 106, the second limb 110 can be pivoted from the stowed configuration underneath the first limb 106 to a position to perform work. The stowaway capability of the second limb 110 contributes to enable the robotic apparatus 100 to be implemented with dimensions fitting a small/compact footprint and yet still have a wide operation reach.

The robotic apparatus 100 further comprises an end effector mount 112 located at one end of the second limb 110 such that the end effector mount 112 is rotatable about the longitudinal axis 113 of the second limb 110. The end effector mount 112 is configured to receive one or more types of end effectors (not shown in FIG. 1). The end effector mount 112 may be a separate element attached to the second limb 110 or integrated with the second limb 110. In the present example, the end effector mount 112 is a separate element attached to the second limb 110. Depending on the application of the robotic apparatus 100, an example of an end effector could be a gripping device, a suction device, a magnetic grip device and the like.

The robotic apparatus 100 comprises a third guide rail 114 attached to the elongate support 104. The third guide rail 114 is configured to guide movement of the elongate support 104 in the two directions that the elongate support 104 is movable along the first guide rail 102. One end of the elongate support 104 opposite to the end of the elongate support 104 attached to the first guide rail 102 is attached to the third guide rail 114. The third guide rail 114 provides an advantage of additional guiding capability to ensure smooth movement of the elongate support 104 in the two directions that the elongate support 104 is movable along the first guide rail 102. Another advantage of the third guide rail 114 is that it ensures stable movement of the elongate support 104 especially when the elongate support 104 is configured to move at fast speed.

In the present example, the third guide rail 114 and the first guide rail 102 are for guiding linear movement and are parallel to each other. It is appreciated that the guiding path of the third guide rail 114 and the first guide rail 102 may be curved and not fully linear in other configurations. Similarly, although in the present example, the guiding path of the second guide rail 108 of the elongate support 104 is linear as shown in FIG. 1, the second guide rail 108 may be curved and not fully linear in other configurations.

In the present example, the second limb 110 is described to be pivotable about the axis 111 orthogonal to the longitudinal axis 113 of the second limb 110. However, it is possible that a universal joint is provided to join the second limb 110 to the first limb 106 and the universal joint allows the second limb 110 to also pivot about other axes such as the longitudinal axis 105 of the first limb 106. If the universal joint is provided, a suitable driving mechanism has to be provided to drive the various pivoting movements of the second limb 110 relative to the first limb 106.

The robotic apparatus 100 further comprises a plurality of driving mechanisms 115, 116, 117, 118, 119, 120 and 121 to drive the movement of the elongate support 104, the first limb 106, the second limb 110, and the end effector mount 112. A first driving mechanism 116 is mounted at the end of the elongate support 104 attached to the first guide rail 102 to drive rotational movement of the elongate support 104 about the longitudinal axis 103 at each position on the first guide rail 102. A second driving mechanism 117 is provided at the tracks 101 of the first guide rail 102 to drive movement of the elongate support 104 along the first guide rail 102. A third driving mechanism 119 is mounted in the first limb 106 to drive the extending and retracting movements of the first limb 106. A fourth driving mechanism 120 is mounted at the end of the first limb 106 attached to the second limb 110 to drive pivoting movements of the second limb 110 about the axis 111 orthogonal to the longitudinal axis 105 of the first limb 106. In other configurations, the fourth driving mechanism 120 may be mounted at an end of the second limb 110 attached to the first limb 106 instead. A fifth driving mechanism 118 is mounted at the end effector mount 12 or at the end of the second limb 110 attached to the end effector mount 112 to drive rotational movements of the end effector mount 112 about the longitudinal axis 113 of the second limb 110.

In the present example, a sixth driving mechanism 115 is mounted at the end of the elongate support 104 attached to the third guide rail 114 to drive rotational movement of the elongate support 104 about the longitudinal axis 103 of the elongate support 104 at each position on the third guide rail 114. The sixth driving mechanism 115 is optional because the rotational movement of the elongate support 104 about the longitudinal axis 103 of the elongate support 104 at each position on the third guide rail 114 and at each position on the first guide rail 102 can actually be driven by just one driving mechanism, which in this case can be the first driving mechanism 116 mounted at the end of the elongate support 104 attached to the first guide rail 102. However, the sixth driving mechanism 115 provides an advantage if present in that having two separately controlled driving mechanisms, which in this case are the first driving mechanism 116 and the sixth driving mechanism 115, would provide more precise movement and better handling of fast speed movement of the elongate support 104. Such precision is beneficial especially if the robotic apparatus 100 is to be implemented to have dimensions to fit within a small footprint of, for instance, about length 0.5 m to 10 m (X axis range), width 0.1 m to 1 m (Y axis range) and height 0.5 m to 3 m (Z axis range). The length or X axis range may be the movable length of the elongate support 104 along the first guide rail 102 and/or the third guide rail 114, which may be about the length of the first guide rail 102 or the third guide rail 114. The width or Y axis range may then be the width of the first guide rail 102 or the third guide rail 114 accordingly. Accordingly, the height or Z axis range is the length of the elongate support 104. A specific footprint of the robotic apparatus 100 within these length (X), width (Y) and height (Z) ranges that is found to be particularly useful to certain applications is about length 1.4 m, width 0.45 m and height 2.6 m. Such applications may include applications in smaller testing and/or sorting stations (or cells) for industrial automation in assembly/testing/manufacturing processes of electronics and biomedical/biotechnology industries. Another good compact range of the footprint of the robotic apparatus 100 for such applications is length 0.5 m to 2 m, width 0.4 m to 0.5 m, and height 0.4 m to 2.7 m. Having the robotic apparatus 100 at around such size advantageously allows the robotic apparatus 100 to be provided with an end effector attached to the end effector mount 112 that is able to reach within a working space or volume of length 1 m, width 1 m and height 1 m around a part of the robotic apparatus 100, for instance, around a center, Ctr, of the elongate support 104. In the present example, the center Ctr is midway along the length of the second guide rail 108. Examples of the part of the robotic apparatus 100 that determines the working space may also be other parts such as a center of an end effector mounted to the end effector mount 112 or center of the first limb 106 or second limb 110. Depending on the application, a possible lower limit for the working space or volume may be length 0.4 m, width 0.4 m and height 0.4 m. Correspondingly, the robotic apparatus 100 has to be sized accordingly to be able to work within this working space. Conventional robots are unable to operating within such small footprint and working space.

In the present example, a seventh driving mechanism 121 (not fully drawn in FIG. 1) is mounted at the third guide rail 114 to drive movement of the elongate support 104 along the third guide rail 114. The seventh driving mechanism 121 is optional because the movement of the elongate support 104 along the third guide rail 114 and along the first guide rail 102 can actually be driven by just one driving mechanism, which in this case can be the second driving mechanism 117 at the tracks 101 of the first guide rail 102. However, the seventh driving mechanism 121 provides an advantage if present in that having two separately controlled driving mechanisms, which in this case are the second driving mechanism 117 and the seventh driving mechanism 121, would provide more precise movement and better handling of fast speed movement of the elongate support 104. Similarly, such precision is beneficial especially if the robotic apparatus 100 is to be implemented to have dimensions to fit within a small footprint of, for instance, about length 0.5 m to 10 m (X axis range), width 0.1 m to 1 m (Y axis range) and height 0.5 m to 3 m (Z axis range). The length or X axis range may be the movable length of the elongate support 104 along the first guide rail 102 and/or the third guide rail 114, which may be about the length of the first guide rail 102 or the third guide rail 114. The width or Y axis range may then be the width of the first guide rail 102 or the third guide rail 114 accordingly. Accordingly, the height or Z axis range is the length of the elongate support 104. A specific size of the robotic apparatus 100 within these length (X), width (Y) and height (Z) ranges that is found to be particularly useful to certain applications is about length 1.4 m, width 0.45 m and height 2.6 m. Such applications may include applications in smaller testing and/or sorting stations (or cells) for industrial automation in assembly/testing/manufacturing processes of electronics and biomedical/biotechnology industries. Another good compact range of the footprint of the robotic apparatus 100 for such applications is length 0.5 m to 2 m, width 0.4 m to 0.5 m, and height 0.4 m to 2.7 m. Having the robotic apparatus 100 at around such size advantageously allows the robotic apparatus 100 to be provided with an end effector attached to the end effector mount 112 that is able to reach within a working space or volume of length 1 m, width 1 m and height 1 m around a part of the robotic apparatus 100, for instance, around the center, Ctr, of the elongate support 104. Depending on the application, a possible lower limit for the working space or volume may be length 0.4 m, width 0.4 m and height 0.4 m. Correspondingly, the robotic apparatus 100 has to be sized accordingly to be able to work within this working space. Conventional robots are unable to operating within such small footprint and working space.

The movement of the elongate support 104 at the third guide rail 114 and the first guide rail 102 are driven by synchronous movement of physically decoupled driving mechanisms. No physical connection exists between the driving mechanisms. This feature allows the movement of the elongate support 104 to be highly precise and to operate at high speed. One or two separate programs and software may be used to control each driving mechanism 115, 16, 117 or 121 driving the movement of the elongate support 104 at the third guide rail 114 and the first guide rail 102. The programs and software control the driving mechanism 115, 116, 117 and 121 via commands. The commands sent to the driving mechanisms 115 and 116 by the programs and software are coordinated to keep the drive of the driving mechanisms 115 and 116 properly aligned. Similarly, the commands sent to the driving mechanisms 117 and 121 by the programs and software are coordinated to keep the drive of the driving mechanisms 117 and 121 properly aligned.

The wattages used for the driving mechanisms driving the movement of the elongate support 104 at the third guide rail 114 and the driving mechanisms driving the movement of the elongate support 104 at the first guide rail 102 may be different. Higher wattage means stronger drive and lower wattage means lower drive. It may be configured such that the driving mechanisms 116 and 117 driving the movement of the elongate support 104 at the first guide rail 102 are the master driving mechanisms and the driving mechanisms 115 and 121 driving the movement of the elongate support 104 at the third guide rail 114 are slave driving mechanisms. The master driving mechanisms can be configured to provide more drive than the slave driving mechanisms and thus have higher wattages than the slave driving mechanisms. In this manner, if there is lack of coordination or misalignment, there will still be sufficiently strong drive provided by the master driving mechanisms to override the drive provided by the slave driving mechanisms. Specifically, in the present example, the driving mechanism 116 driving the rotation of the elongate support 104 at the position along the first guide rail 102 is the master and is configured with stranger drive than the driving mechanism 115 driving the rotation of the elongate support 104 at the position along the third guide rail 114. The driving mechanism 117 driving the movement of the elongate support along the first guide rail 102 is configured with stronger drive than the driving mechanism 121 driving the movement of the elongate support 104 along the third guide rail 114.

Each of the driving mechanisms 115 to 121 may be constructed and configured differently to provide the drive required. As an example, one of the driving mechanisms may comprise one or more motors, gears, pinions, belts, chains, hydraulic pneumatic pump and/or valves, and the like to provide the drive required. It is appreciated that a skilled artisan would be able to work out the suitable design of the driving mechanisms based on the description of the robotic apparatus 100 described herein.

All translational (including linear), rotational, and pivoting movements of the elements of the robotic apparatus 100 as described above are understood to include translational (including linear), rotational or pivoting motion in at least one direction. All the possible movements are illustrated by arrows present in FIG. 1. The robotic apparatus 100 as described can be used for many applications, for example, manufacturing of articles, assembly of objects, movement of objects, handling of machine tools, spot welding, inspection of objects, handling required in die casting machines, electronic circuit manufacturing and the like.

All the driving mechanisms 115 to 121 of the robotic apparatus 100 are connected to a power source 123 and connected to a computer or server 122 arranged to control the driving mechanisms 115 to 121 to drive the respective movements to be driven by the driving mechanisms 115 to 121. The power source 123 can be one or more portable batteries, an electrical power generator, electrical mains, and the like. The movement speed of the various driving mechanisms 115 to 121, including movement speed of the end effector to be mounted to the end effector mount 112 may be configured to about a speed range of greater than 0m/s (meter per second) to about 1.3 m/s depending on the application of the robotic apparatus 100. The tool tip speed may be about a speed range of greater than 0m/s (meter per second) to about 1.3 m/s.

The robotic apparatus 100 of FIG. 1 can be said to be a hybrid Cartesian and cylindrical robot capable of servicing high density test cells. In the present example, the mechanical mechanisms i.e. the elements with reference numerals 101 to 121 of FIG. 1 of the robotic apparatus 100 have an advantage that they can be sized to fit in a small/compact footprint and yet still has a wide operation reach. The wide operation reach is achievable at least due to:

the first guide rail 102 and the corresponding third guide rail 114 providing operation reach to the robotic apparatus 100 at locations along the first guide rail 102 and the third guide rail 114;

the extendable and retractable features of the first limb 106;

the pivotable second limb 110 to further extend the operation reach after the first limb 106 extends; and the second guide rail 108 providing operation reach to the robotic apparatus 100 at locations along the second guide rail 108.

In the present example, the elongate support 104, the first guide rail 102, the first limb 106, the second limb 110, the third guide rail 114, and the end effector mount 112 are made to be modular and to accommodate high speed movement. Due to the modular design, the robotic apparatus 100 is scalable to cater to different application needs. Modular design in the present example refers to each of the stated elements being made to be detachable from one another and be replaced by elements having the same joints for attaching to the other elements. For instance, several different elongate support 104 with different lengths can be made with the same joints for attaching to the first guide rail 102 and the third guide rail 114. The first guide rail 102, the third guide rail 114, the first limb 106, the second limb 110 and the end effector mount 112 (if not integrated with the second limb 110) can also be made to have different versions for performing different functions and/or have different dimensions but all of them are made with the same joints for attaching to one another. This allows the robotic apparatus to be highly customizable to serve different purposes.

Figure 2:
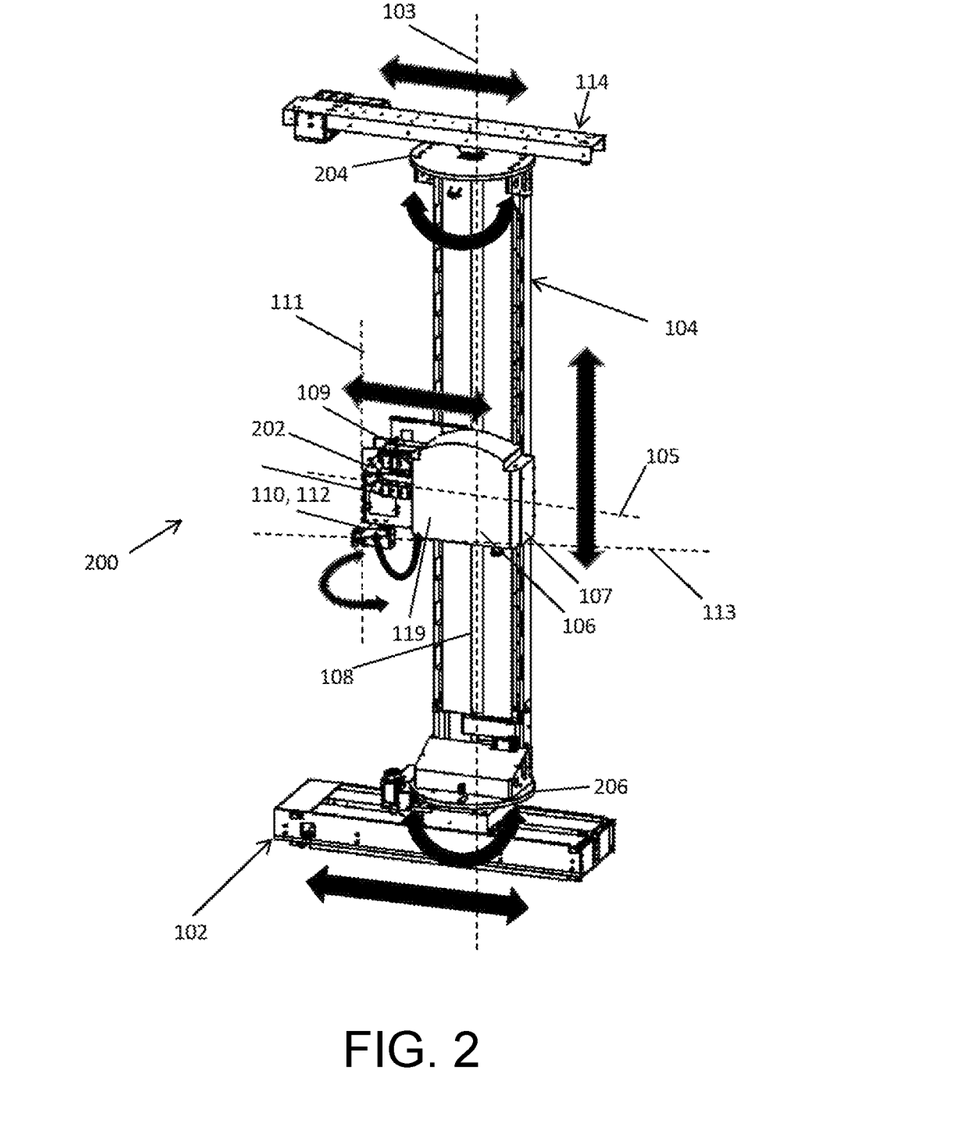
FIG. 2 is a front perspective view of a robotic apparatus similar to the robotic apparatus of FIG. 1.

FIG. 2 shows another example of a robotic apparatus 200 that is similar to the robotic apparatus 100 of FIG. 1. The robotic apparatus 200 comprises all the elements of the robotic apparatus 100 except for some differences, which will be elaborated as follows. The reference numerals of the elements in the robotic apparatus 100 are reused for the similar elements also found in the robotic apparatus 200. Similarly, the robotic apparatus 200 comprises two guide rails 102 and 114 attached to an elongate support 104 such that the elongate support 104 is movable along the two guide rails 102 and 114 and rotatable at each position along the two guide rails 102 and 114. The robotic apparatus 200 also comprises a first limb 106 attached to be movable along a second guide rail 108 disposed along a longitudinal axis 103 of the elongate support 104. The first limb 106 comprises two parts 107 and 109 movable relative to each other. There is a second limb 110 pivotably attached to the first limb 106 such that the second limb 110 is pivotable about an axis 111 orthogonal to the longitudinal axis 105 of the first limb 106. An end effector mount 112 is located at the second limb 110 such that the end effector mount 112 is rotatable about a longitudinal axis 113 of the second limb 110. In the example of FIG. 2, the end effector mount 112 and the second limb 110 of the robotic apparatus 200 are integrated to each other such that they are one element and not separately attached to each other. The robotic apparatus 200 further includes the driving mechanisms 115 to 121, the power source 123 and the computer or server 122 of FIG. 1 disposed at on or about the same locations as these elements in FIG. 1. However, only the elements that are discussed are marked out in FIG. 2.

All translational (including linear), rotational, and pivoting movements of the elements of the robotic apparatus 200 as described above are understood to include translational (including linear), rotational or pivoting motion in at least one direction. All the possible movements are illustrated by arrows present in FIG. 2. In the robotic apparatus 100, with reference to FIG. 1, the second guide rail 108 is located between the two elongate bars 124 forming the elongate support 104. The first limb 106 is mounted to be movable along the second guide rail 108 and as such the first limb 106 is located between the two support bars 124.

However, in the robotic apparatus 200, with reference to FIG. 2, the second guide rail 108 is configured as a track disposed centrally along the elongate support 104. One side surface of the first limb 106 is attached to be movable along the second guide rail 108. In other configurations, it is possible to have more than one track.

In the robotic apparatus 100, with reference to FIG. 1, specifically, the second part 109 of the first limb 106 is slidable over an outer surface of the first part 107 of the first limb 106 to extend or retract.

However, in the robotic apparatus 200, with reference to FIG. 2, the first part 107 of the first limb 106 is a housing and the second part 109 of the first limb 106 is retractable into the housing and extendable to an area outside of the housing. The second part 109 is arranged to be slidable over one or more inner surfaces of the housing. The housing helps to house elements of the third driving mechanism 119 such as a chain 202 to provide the required drive for the second part 109 to extend and retract relative to the first part 107. Specifically, the side surface of the first limb 106 that is attached to be movable along the second guide rail 108 is a side surface of the housing. Hence, the housing also houses elements movably attached to the second guide rail 108 of the elongate support 104.

Furthermore, the robotic apparatus 200 has a first circular plate 204 disposed at the end of the elongate support 104 attached to the first guide rail 102 and a second circular plate 206 disposed at the end of the elongate support 104 attached to the third guide rail 114.

Figure 3A:
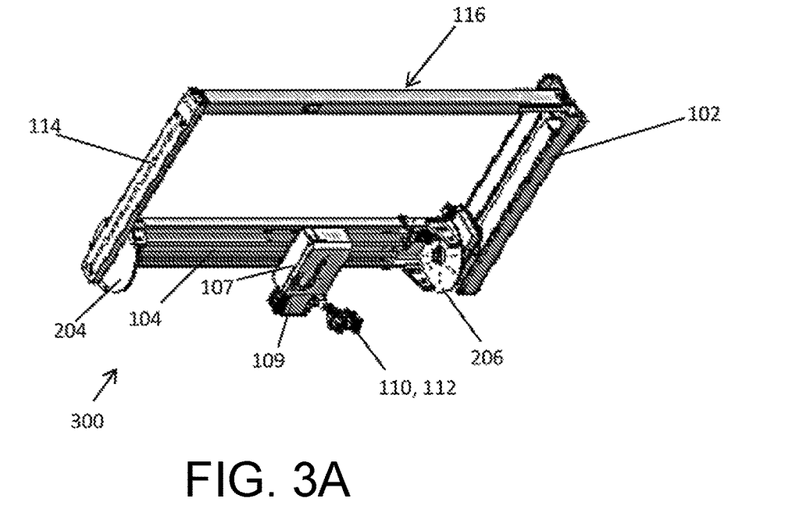
FIG. 3A is a front perspective view of a robotic apparatus similar to the robotic apparatus of FIG. 2.

FIG. 3A is a front perspective view of a robotic apparatus 300 similar to the robotic apparatus 200 of FIG. 2. The robotic apparatus 300 comprises all the elements of the robotic apparatus 200 of FIG. 2 with some differences in the design of the housing of the first limb 106 of FIG. 2 and the second guide rail 108 of FIG. 2. However, the function/purpose of these features remains the same. The reference numerals of the elements in the robotic apparatus 200 of FIG. 2 are reused for the similar elements also found in the robotic apparatus 300 of FIG. 3A. Similarly, the robotic apparatus 300 comprises two guide rails 102 and 114 attached to an elongate support 104 such that the elongate support 104 is movable along the two guide rails 102 and 114 and rotatable at each position along the two guide rails 102 and 14. The robotic apparatus 300 also comprises a first limb 106 attached to be movable along the second guide rail 108 of the elongate support 104. The first limb 106 comprises two parts 107 and 109 movable relative to each other. There is a second limb 110 pivotably attached to the first limb 106. An end effector mount 112 is located at an end of the second limb 110 such that the end effector mount 112 is rotatable about the end of the second limb 110. In the example of FIG. 3A, the end effector mount 112 and the second limb 10 of the robotic apparatus 200 are integrated to each other such that they are one element and not separately attached to each other. Just like the robotic apparatus 200 of FIG. 2, the robotic apparatus 300 further includes the driving mechanisms 115 to 121, the power source 123 and the computer or server 122 of FIG. 1 disposed at on or about the same locations as these elements in FIG. 1. However, only the elements that are discussed are marked out in FIG. 3A. Furthermore, the robotic apparatus 300 has a first circular plate 204 disposed at the end of the elongate support 104 attached to the first guide rail 102 and a second circular plate 206 disposed at the end of the elongate support 104 attached to the third guide rail 114.

A key feature shown in FIG. 3A and not present in the examples of FIGS. 1 and 2 is a support 116 attached to the first guide rail 102 and the third guide rail 114. The support 116 aligns the first guide rail 102 with the third guide rail 114 to provide aligned guiding paths for smooth movement of the elongate support 104 in the same directions along the first and third guide rails 102 and 114. In the case of FIGS. 1 and 2, which has no such support 116, the first and third guide rails 102 and 114 has to be, for instance, individually mounted to wall structures, beams or a support frame structure to set them in the desired or appropriate configuration for the operation of the robotic apparatuses 100 and 200.

Figure 3B:
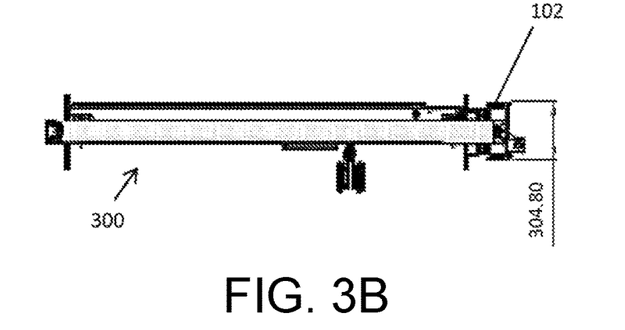
FIG. 3B is a right side view of the robotic apparatus of FIG. 3A.
Figure 3C:
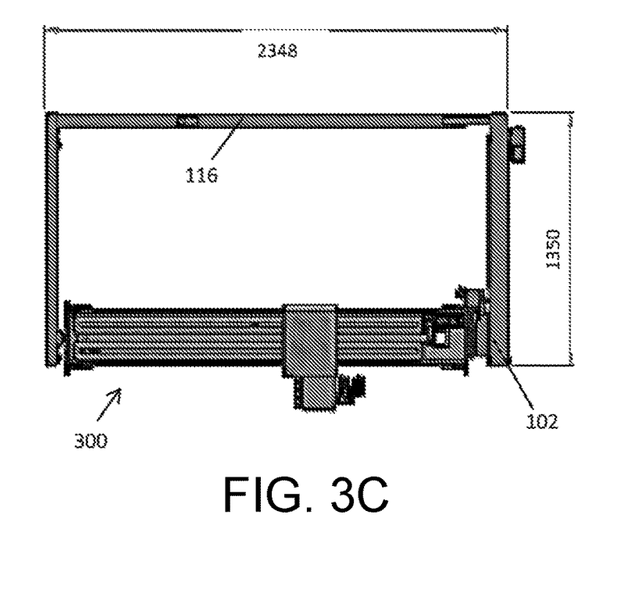
FIG. 3C is a front view of the robotic apparatus of FIG. 3A.
Figure 3D:
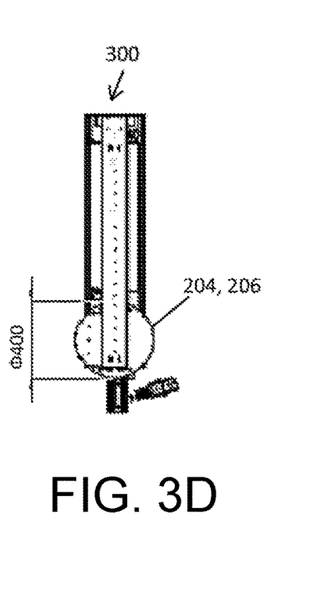
FIG. 3D is a top view of the robotic apparatus of FIG. 3A.

FIG. 3B is a right side view of the robotic apparatus 300 of FIG. 3A. FIG. 3C is a front view of the robotic apparatus 300 of FIG. 3A. FIG. 3D is a top view of the robotic apparatus 300 of FIG. 3A. The purpose of FIG. 3B to 3D is to illustrate examples of the possible dimensions of the robotic apparatus 300 to highlight the fact that the robotic apparatus 300 may be configured with dimensions to fit within a small/compact benchmark footprint of about length 0.5 m to 10 m, width 0.45 m to 1 m and height 0.5 m to 3 m.

Specifically, FIG. 3B illustrates dimension of the width of the first guide rail 102 at 304.80 mm.

FIG. 3C illustrates dimensions of the length of the support 116 at 2348 mm, which is indicative of the height of the robotic apparatus 300 and is within the benchmark footprint height range of 0.5 m to 3 m. FIG. 3C also illustrates dimension of the full length of the first guide rail 102 at 1350 mm, which is indicative of the length of the robotic apparatus 300 and within the benchmark footprint length range of 0.5 to 10 m.

FIG. 3D illustrates dimensions of the diameters of the plates 204 and 206 at 400 mm, which is indicative of the width of the robotic apparatus 300 and within the benchmark footprint width range of 0.1 to 1 m.

The lower limit or boundary of the dimensions of the robotic apparatus 300 is limited by practical concerns, for instance, the application of the robotic apparatus 300, the size of the articles to be handled, size of available components of the driving mechanisms 15 to 121 (not marked out in FIGS. 3A to 3D), and size of available components of other elements of the robotic apparatus such as the elongate support 104, the first guide rail 102 and so on that are to be installed to assembly the robotic apparatus 300.

It is appreciated that the robotic apparatus 100, 200, and 300 herein described with reference to FIGS. 1 to 3A may be configured to have dimensions larger than the benchmark footprint of length 0.5 m to 10 m, width 0.1 to 1 m and height 0.5 m to 3 m depending on the application of the robotic apparatus 300. These benchmark footprint ranges are particularly useful for certain applications to be implemented for smaller testing and/or sorting stations (or cells) for industrial automation in assembly/testing/manufacturing processes of electronics and biomedical/biotechnology industries.

Figure 4A:
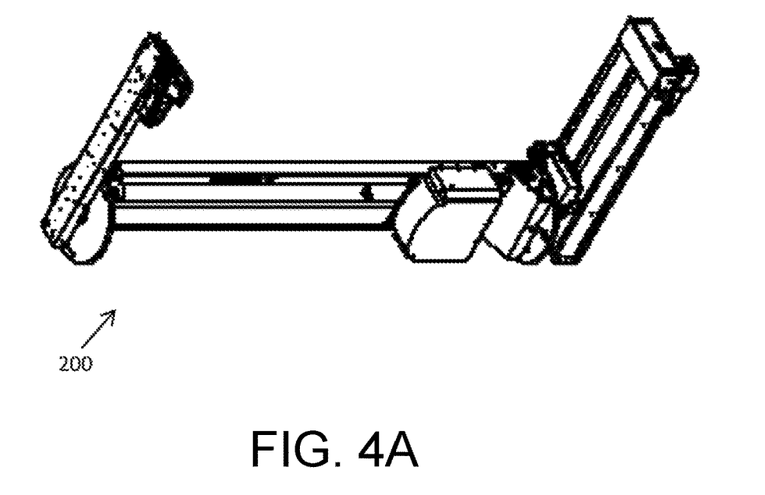
FIG. 4A is a front perspective view of the robotic apparatus of FIG. 2.
Figure 4B:
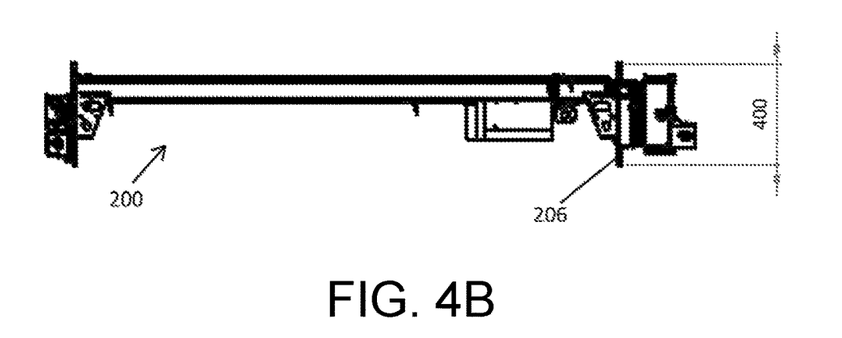
FIG. 4B is a right side view of the robotic apparatus of FIG. 4A.

FIG. 4A is a front perspective view of the robotic apparatus 200 of FIG. 2. FIG. 4B is a right side view of the robotic apparatus 200 of FIG. 4A. Figure AC is a front view of the robotic apparatus 200 of FIG. 4A. The purpose of FIGS. 4B and 4C is to illustrate examples of the possible dimensions of the robotic apparatus 200 to highlight the fact that the robotic apparatus 200 may be configured with dimensions to fit within a small/compact benchmark footprint of about length 0.5 to 10 m, width 0.1 to 1 m and height 0.5 to 3 m.

FIG. 4B illustrates dimensions of the diameters of the plate 206 at 400 mm, which is indicative of the width of the robotic apparatus 200 and is within the benchmark footprint width range of 0.1 to 1 m.

Figure 4C:
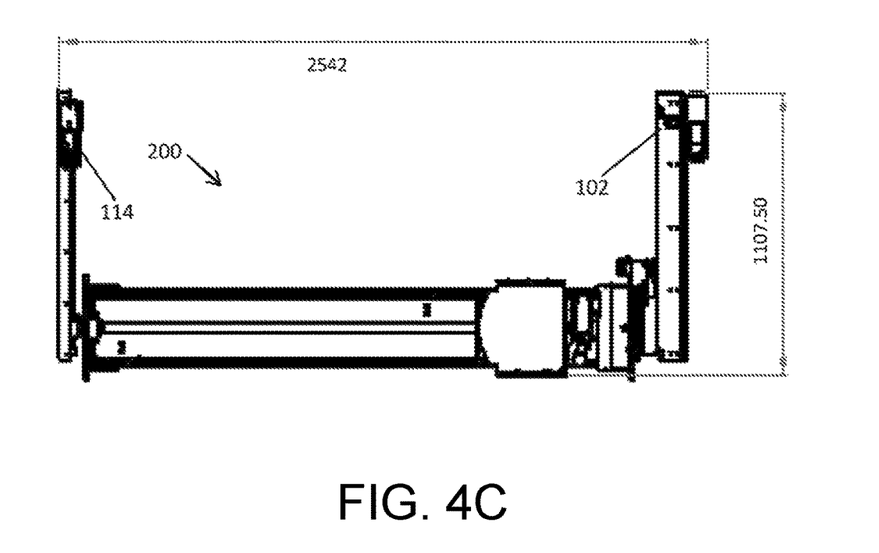
FIG. 4C is a front view of the robotic apparatus of FIG. 4A.

FIG. 4C illustrates dimensions of the end to end length of the first guide rail 102 and third guide rail 114 at 2542 mm, which is indicative of the height of the robotic apparatus 200 and is within the benchmark footprint height of 0.5 to 3 m. FIG. 4C also illustrates dimension of the length of the first guide rail 102 at 1107.50 mm, which is indicative of the length of the robotic apparatus 200 and is within the benchmark footprint length of 0.5 to 10 m.

Similarly, the lower limit or boundary of the dimensions of the robotic apparatus 200 is limited by practical concerns, for instance, the application of the robotic apparatus 200, the size of the articles to be handled, size of available components of the driving mechanisms 115 to 121 (not marked out in FIGS. 4A to 4C), and size of available components of other elements of the robotic apparatus such as the elongate support 104, the first guide rail 102 and so on that are to be installed to assembly the robotic apparatus 200.

FIGS. 5A to 5G illustrate the robotic apparatus 100 of FIG. 1 performing an operation within a working space 500 of the robotic apparatus 100. The operation is to pick an object from a location A and to place the object at a location B within the working space 500. Location A is in a lot 502 within the working space 500. Location B is located along a manufacturing line 506. In other applications of the robotic apparatus 100, location B could be in an inspection station, a line for assembling articles, a conveying mechanism to move the object to another station downstream, and the like. The advantageous wide operation reach of the robotic apparatus 00 is apparent from FIGS. 5A to 5G. The reference numerals of the elements of the robotic apparatus 00 that would be discussed as follows are marked out in FIGS. 5A to 5G. All translational (including linear), rotational, and pivoting movements of the elements of the robotic apparatus 100 are illustrated by arrows present In FIGS. 5A to 5G. The arrows are numbered off in sequence of 1 to 12 to show the sequence order of movements of the elements of the robotic apparatus 100. It is noted that what is illustrated in FIGS. 5A to 5G Is Just an example of an efficient series of sequential movements that the robotic apparatus 100 is capable of. The third guide rail 14 of FIG. 1 is deliberately absent in FIGS. 5A to 5G to show more clearly the elements that are operating under the third guide rail 114.

Figure 5A:
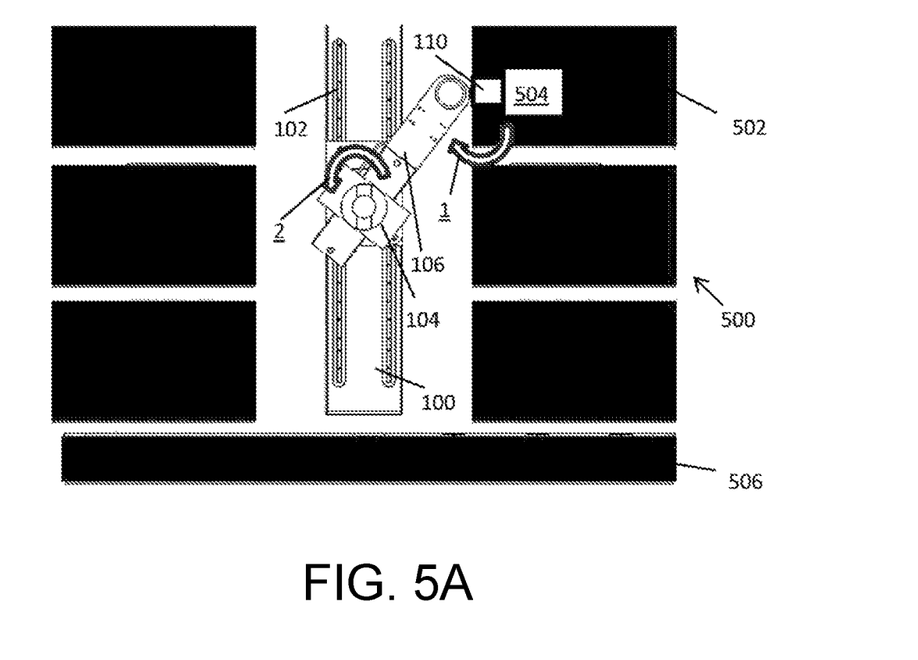
FIG. 5A is a top view of the robotic apparatus of FIG. 1 illustrating a first step in an operation performed by the robotic apparatus.

Specifically, FIG. 5A shows a configuration of the robotic apparatus 100 with the first limb 106 already fully extended away from the elongate support 104 to reach for an object to be picked from a location A in a lot 502 of the working space 500. The elongate support 104 is located midway along the first guide rail 102. The end effector mount 112 located at the second limb 110 is mounted with an end effector 504 configured to pick the object. The elongate support 104 has also rotated at its position along the first guide rail 102 so as to extend reach of the end effector 504 to the location A. The second limb 110 has pivoted about the end of the first limb 106 that is attached to the second limb 110 by an angle sufficient to extend the reach of the end effector 504 to pick the object at location A. An arrow 1 in FIG. 5A shows the direction that the second limb 110 has to first pivot back to its stowed configuration under the first limb 106 to commence the operation to move the picked object from location A to location B. Another arrow 2 shows the direction that the elongate support 104 has to rotate at its position along the first guide rail 102 to align the first limb 106 with the first guide rail 102. The second limb 110 would be aligned with the first limb 106 in its stowed configuration.

Of course, in other examples, the elements of the robotic apparatus 100 may move in other possible ways. For instance, the elongate support 104 is first moved along the first guide rail 102 to a position closer to location A so that the first limb 106 does not have to fully extend but extend just enough to allow the second limb 110 to be pivoted to enable the end effector 504 mounted to the second limb 110 to reach location A.

It is noted that in the design of robotic apparatus 100, the first limb 106 has to be extended out sufficiently to allow the second limb 110 to be pivoted and not knock into one of two the elongate bars 124 (not visible in FIG. 5A) of the elongate support 104. In the design of the robotic apparatuses 200 and 300 of FIGS. 2 and 3A respectively, the pivoting movement of the second limb 110 will not be blocked by the elongate support 104 if the second limb 110 pivots in a direction avoiding contact with the elongate support 104 because unlike the second limb 110 of the robotic apparatus 100, the second limb 110 is not sandwiched between the elongate bars 124 of the elongate support 104 and is not obstructed by them when the first limb 106 is retracted. At most, the pivoting movement of the second limb 110 of the robotic apparatuses 200 and 300 of FIGS. 2 and 3A is blocked by the body of the elongate support 104 if the second limb 110 is pivoted in a direction that would contact the body of the elongate support 104. However, pivoting movement of the second limb 110 in a direction that would not be obstructed by the body of the elongate support 104 is still possible. Hence, there is an advantage in the configuration that the first limb 106 is attached to the second guide rail 108 of the elongate support 104 such that pivoting movement of the second limb 110 in at least one direction is not obstructed by the elongate support 104.

Figure 5B:
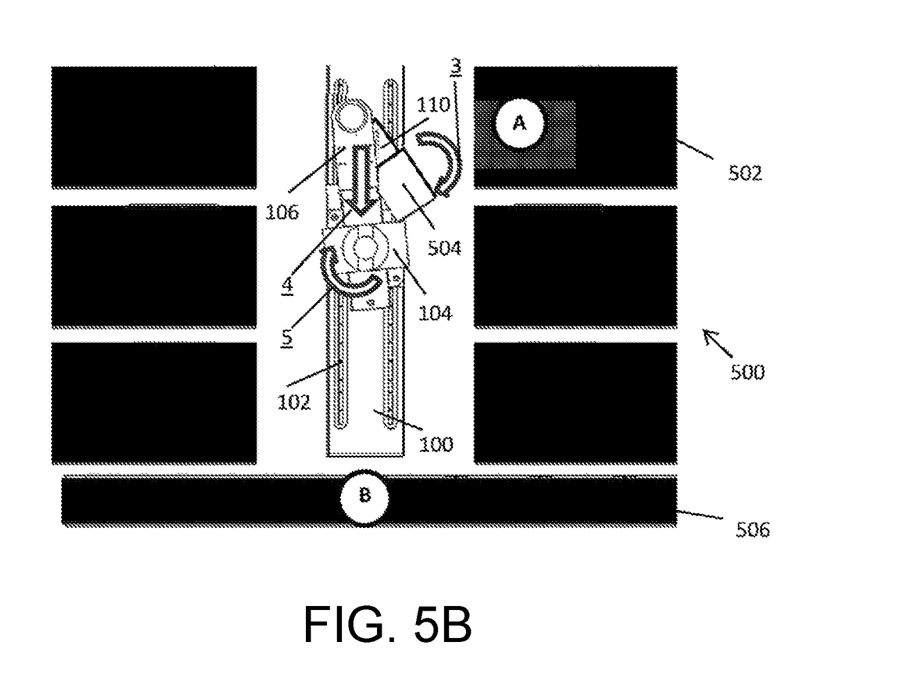
FIG. 5B is a top view of the robotic apparatus of FIG. 1 illustrating a second step in the operation performed by the robotic apparatus.

FIG. 5B shows a configuration of the robotic apparatus 100 after movements earned out in the configuration of the robotic apparatus 100 in FIG. 5A. The second limb 110 mounted with the end effector 504 carrying the object has pivoted halfway towards the first limb 106. The elongate support 104 has rotated to a configuration such that the first limb 106 is at an angle slightly offset from a configuration in which the first limb 106 is in alignment with the first guide rail 102. In this example, this angle offset is present so as to ensure the extended first limb 106 and the second limb 110 or the extended first limb 106 and the second limb 110 including the end effector mount 112 and the end effector do not extend beyond a restricted working space around or surrounding a part of the robotic apparatus 100. In other words, the elongate support 104 is rotatable at each position along the first guide rail 102 to an angle such that the first limb and/or the second limb, when extended, do not extend beyond a restricted working space around a part of the robotic apparatus 100. Alternatively, in other configurations of the robotic apparatus, the elongate support is rotatable at each position along the first guide rail 102 to an angle such that the first limb 106 and the second limb 110 including the end effector mount 112 with or without an end effector mounted to the end effector mount 112, when extended, do not extend beyond a restricted working space around a part of the robotic apparatus 100. For example, the working space can be restricted to 0.45 m by 0.45 m by 0.45 m around the center (Ctr in FIG. 1) of the elongate support 104. This maintains the small/compact footprint of the robotic apparatus 100, which is beneficial for high speed movements of the elements of the robotic apparatus 100. The angle offset can be calculated, for example, based on at least the size of the robotic apparatus 100 and the restriction of the working space. The pivoting movement of the second limb 110 and the rotational movement of the elongate support 104 may be simultaneous. It is appreciated that such movements may not be carried out simultaneously in other examples. An arrow 3 in FIG. 5B shows the direction that the second limb 110 has to continue to pivot back to its stowed configuration under the first limb 106. After the second limb 110 is aligned with the first limb 106 and has assumed its stowed configuration, the extended first limb 106 retracts towards the elongate support 104 in the direction of an arrow 4 shown in FIG. 5B. Thereafter, the elongate support 104 rotates in the direction of an arrow 5 shown in FIG. 5B to align the first limb 106 with the first guide rail 102.

Figure 5C:
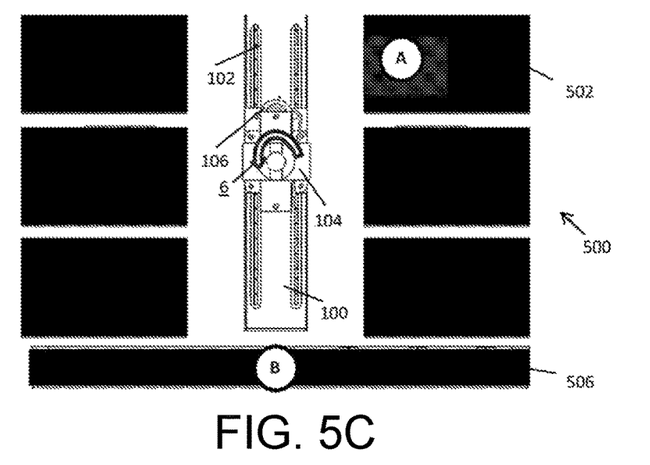
FIG. 5C is a top view of the robotic apparatus of FIG. 1 illustrating a third step in the operation performed by the robotic apparatus.

FIG. 5C shows a configuration of the robotic apparatus 100 after movements carried out in the configuration of the robotic apparatus 100 in FIG. 5B. The second limb 110 has fully pivoted to align with the first limb 106. The first limb 106 has fully retracted in the direction towards the elongate support 104 but is currently on a side of the elongate support 104 facing away from location B. The elongate support 104 has also rotated to an extent such that the first limb 106 is aligned with the first guide rail 102. The next movement for the robotic apparatus 100 from the configuration of FIG. 5C is to rotate the elongate support 104 at its position along the first guide rail 102 in the direction of an arrow 6. such that the first limb 106 would move closer to face location B.

Figure 5D:
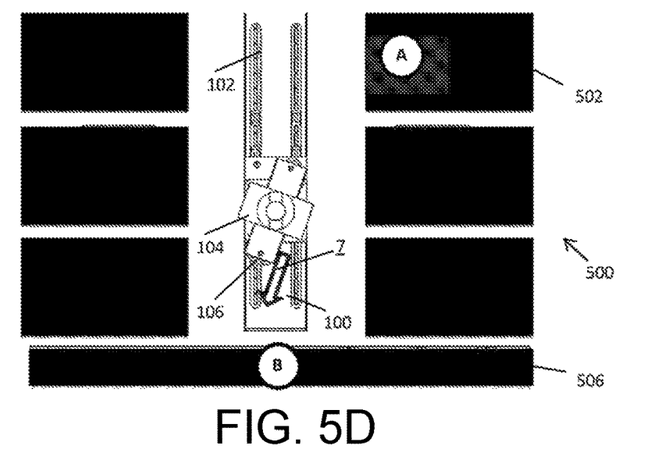
FIG. 5D is a top view of the robotic apparatus of FIG. 1 illustrating a fourth step in the operation performed by the robotic apparatus.

FIG. 5D shows a configuration of the robotic apparatus 100 after the movement earned out in the configuration of the robotic apparatus 100 in FIG. 5C. The elongated support 104 has rotated at its position along the first guide rail 102 such that the first limb 106 is now closer to location B. Similarly, the elongate support 104 has rotated to a configuration such that the first limb 106 is at an angle slightly offset from a configuration in which the first limb 106 is in alignment with the first guide rail 102. In this example, this angle offset is present so as to ensure the extended first limb 106 and the second limb 110 or the extended first limb 106 and the second limb 110 including the end effector mount 112 and the end effector do not extend beyond a restricted working space around or surrounding a part of the robotic apparatus 00. In other words, the elongate support 104 is rotatable at each position along the first guide rail 102 to an angle such that the first limb and/or the second limb, when extended, do not extend beyond a restricted working space around a part of the robotic apparatus 100. Alternatively, in other configurations of the robotic apparatus, the elongate support is rotatable at each position along the first guide rail 102 to an angle such that the first limb 106 and the second limb 110 including the end effector mount 112 with or without an end effector mounted to the end effector mount 12, when extended, do not extend beyond a restricted working space around a part of the robotic apparatus 100. For example, the working space can be restricted to 0.45 m by 0.45 m by 0.45 m around the center (Ctr in FIG. 1) of the elongate support 104. This maintains the small compact footprint of the robotic apparatus 100, which is beneficial for high speed movements of the elements of the robotic apparatus 100. The angle offset can be calculated, for example, based on at least the size of the robotic apparatus 100 and the restriction of the working space. The next movement for the robotic apparatus 100 from the configuration of FIG. 5D is to extend the first limb 106 in a direction closer to the location B, which is indicated by an arrow 7.

Figure 5E:
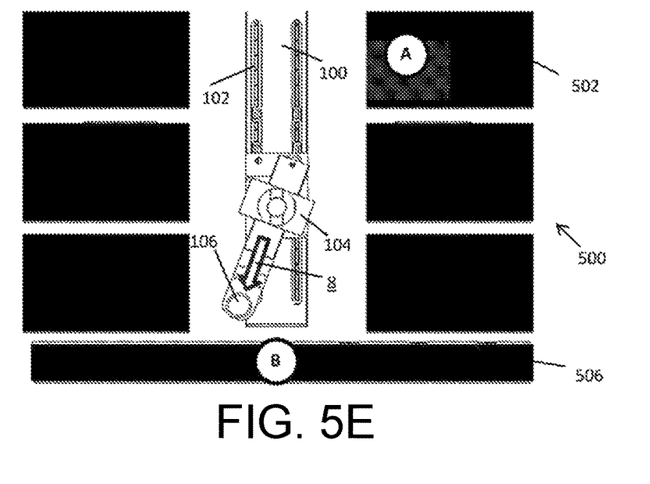
FIG. 5E is a top view of the robotic apparatus of FIG. 1 illustrating a fifth step in the operation performed by the robotic apparatus.

FIG. 5E shows a configuration of the robotic apparatus 100 after the movement carried out in the configuration of the robotic apparatus 100 in FIG. 5D. The first limb 106 continues to extend to in a direction indicated by an arrow 8 to an extent sufficient for the second limb 110 to pivot towards location B and allow the end effector 504 to reach location B.

Figure 5F:
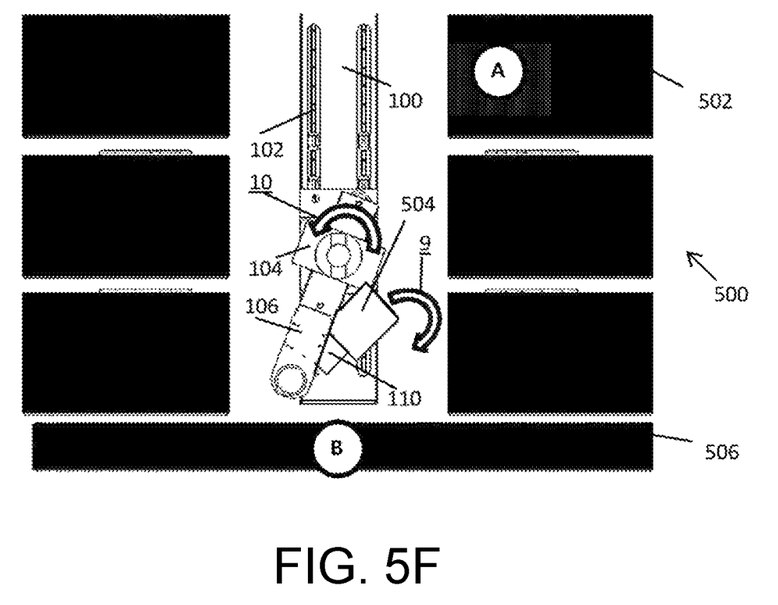
FIG. 5F is a top view of the robotic apparatus of FIG. 1 illustrating a sixth step in the operation performed by the robotic apparatus.

FIG. 5F shows a configuration of the robotic apparatus 100 after the movement earned out in the configuration of the robotic apparatus 100 in FIG. 5E. The second limb 110 has pivoted halfway from its stowed configuration to assume a configuration that allows the end effector 504 to reach location B. The second limb 110 will continue to pivot in the direction of an arrow 9 until the end effector 504 can reach location B. Simultaneously or separately, the elongate support 104 will rotate in the direction of an arrow 10 so as to align the first limb 106 with the first guide rail 102.

Figure 5G:
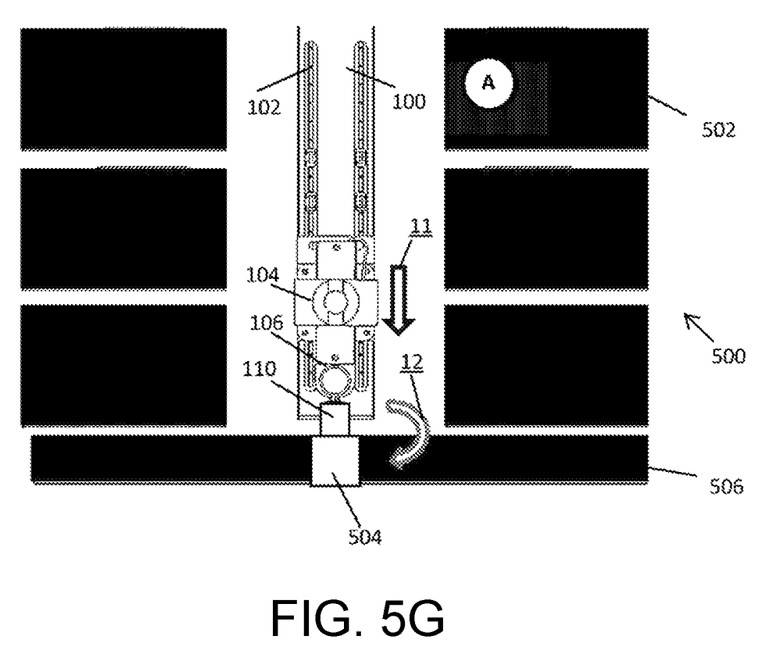
FIG. 5G is a top view of the robotic apparatus of FIG. 1 illustrating a seventh step in the operation performed by the robotic apparatus.

FIG. 5G shows a configuration of the robotic apparatus 100 after the movements canned out in the configuration of the robotic apparatus 100 in FIG. 5F. The elongate support 104 is shown in FIG. 5G to be moving along the first guide rail 102 towards location B and in a direction indicated by an arrow 11. As the elongate support 104 moves towards location B, the first limb 106 retracts. Simultaneously or separately, the second limb 10 further rotates in a direction indicated by an arrow 12 until the second limb 110 is pivoted such that the end effector 504 can reach location B. The movement of the elongate support 104 towards location B could be performed in anticipation of a step after the operation of moving the object from location A to location B. When the end effector 504 reaches location B, the end effector 504 places the object at location B to complete the operation.

Figure 6:
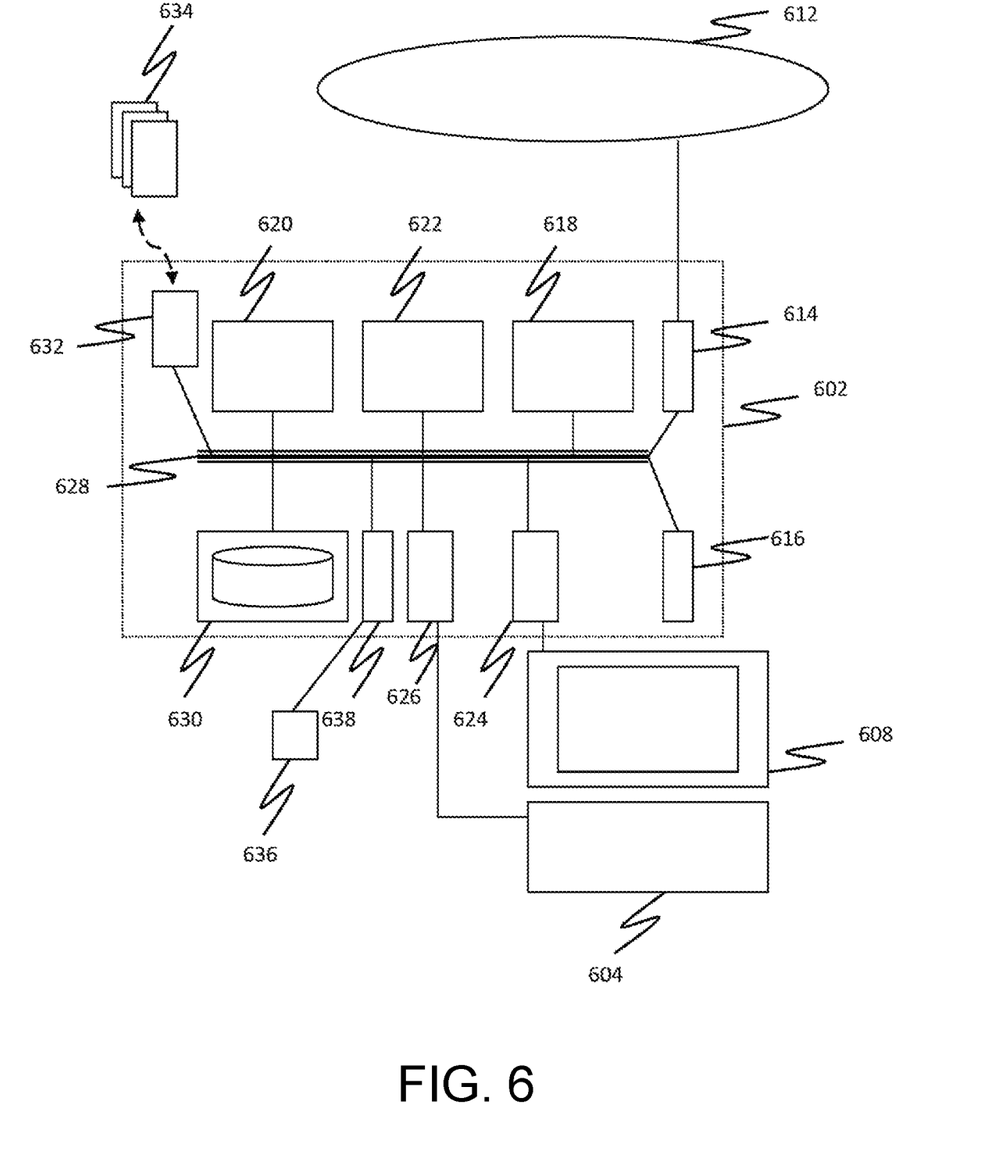
FIG. 6 is a block diagram illustrating an example of a computer or server configured to control the robotic apparatus illustrated in all earlier Figures.

FIG. 6 shows in more detail an example of the computer or server 122 described with reference to FIG. 1. The same computer or server 122 can be used to control each of the examples of the robotic apparatus described with reference to FIGS. 2 to 5G as well. The computer executes programs and software for the operation of the robotic apparatus 00 of FIG. 1, which may include controlling the driving mechanisms 115 to 121 of FIG. 1. The processor may comprise a processing unit 602 for processing software including one or more computer programs for running one or more computer/server applications to determine when to drive movement of the robotic apparatus 100 based on pre-programmed movement sequence and/or based on input from one or more sensors mounted on the robotic apparatus 100. The one or more computer/server applications may also monitor movement status of the driving mechanisms 115 to 121 and provide feedback to determine next action of the robotic apparatus 100.

Furthermore, the processing unit 602 may include user input modules such as a computer mouse 636, keyboard keypad 604, and/or a plurality of output devices such as a display device 608. The display of the display device 608 may be a touch screen capable of receiving user input. The display device 608 may display current movement status of each of the driving mechanisms 115 to 121 and provide text and/or graphic information to an operator operating the robotic apparatus 100.

The processing unit 602 may be connected to a computer network 612 via a suitable transceiver device 614 (i.e. a network interface), to enable access to e.g. an Intranet, the Internet or other network systems such as a wired Local Area Network (LAN) or Wide Area Network (WAN). The processing unit 602 may also be connected to one or more external wireless communication enabled devices 634 via a suitable wireless transceiver device 632 e.g. a WiFi transceiver, Bluetooth module, Mobile telecommunication transceiver suitable for Global System for Mobile Communication (GSM), 3G, 3.5G, 4G telecommunication systems, and the like. The one or more external wireless communication enabled devices 634 may be sensors mounted to the robotic apparatus 100 to obtain measurement and/or input to facilitate the robotic apparatus 100 to carry out functions/operations it is configured to perform. The one or more external wireless communication enabled devices 634 may also be one or more of the driving mechanisms 15 to 121. The one or more external wireless communication enabled devices 634 may further be one or more devices for controlling the operation of the robotic apparatus 100 remotely. Through the computer network 612, the processing unit 602 can gain access to one or more storages i.e. data storages, databases, data servers and the like connectable to the computer network 612 to retrieve and/or store data in the one or more storages. The one or more storages may contain computer programs and software, and data required for the operation of the robotic apparatus 100.

The processing unit 602 may include a processor 618, a Random Access Memory (RAM) 620 and a Read Only Memory (ROM) 622. The processing unit 602 may also include a number of Input Output (I/O) interfaces, for example I/O interface 638 to the computer mouse 636, a memory card slot 616, I/O interface 624 to the display device 608, and I/O interface 626 to the keyboard/keypad 604.

The components of the processing unit 602 typically communicate via an interconnected bus 628 and in a manner known to the person skilled in the relevant art.

The computer programs and software may be supplied to the user of the computer or server 122, or the processor (not shown) of one of the one or more external wireless communication enabled devices 634, encoded on a data storage medium such as a CD-ROM, on a flash memory carrier or a Hard Disk Drive, and are to be read using a corresponding data storage medium drive of a local data storage device 630. The local data storage device 630 may contain computer programs and software, and data required for the operation of the robotic apparatus 100. Such computer or application programs may also be downloaded from the computer network 612. The application programs are read and controlled in its execution by the processor 618. Intermediate storage of program data may be accomplished using RAM 620.

In more detail, one or more of the computer or application programs may be stored on any non-transitory machine- or computer-readable medium. The machine- or computer-readable medium may include storage devices such as magnetic or optical disks, memory chips, or other storage devices suitable for interfacing with a general purpose computer or a mobile device such as a mobile smartphone, laptop, notebook, and the like. The machine- or computer-readable medium may also include a hard-wired medium such as that exemplified in the Internet system, or wireless medium such as that exemplified in the Wireless LAN (WLAN) system and the like. The computer program when loaded and executed on such a general-purpose computer effectively results in the implementation of the steps of the computing methods required to operate the robotic apparatus 100.

Figure 7:
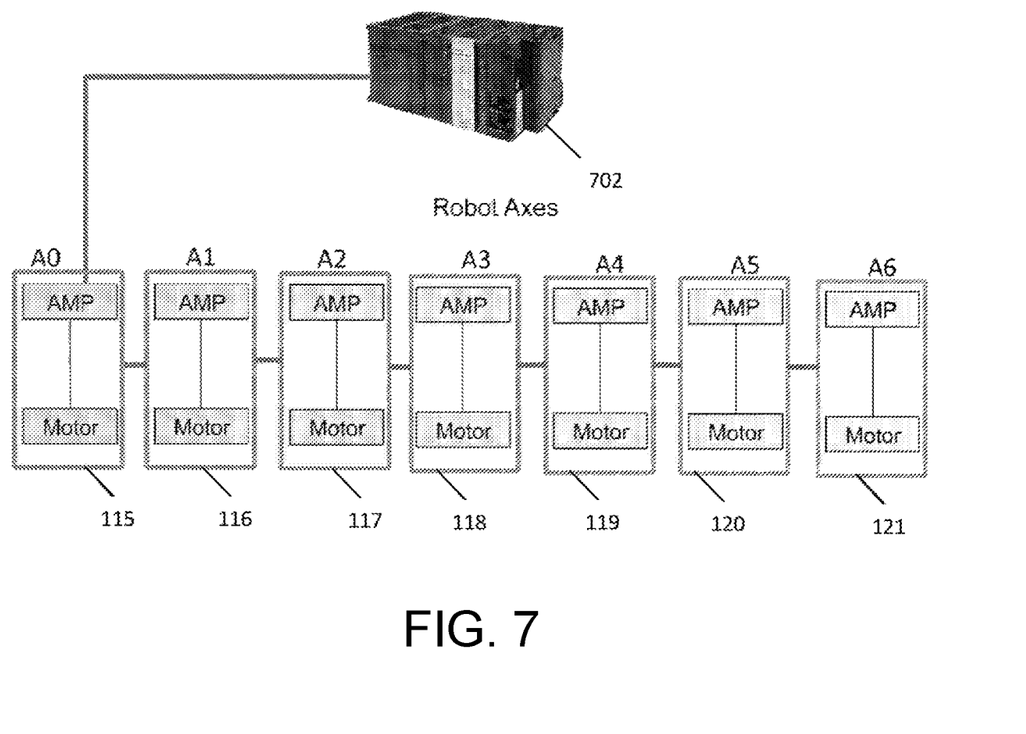
FIG. 7 is a block diagram illustrating an example of a controller configured to control the robotic apparatus illustrated in all earlier Figures.

In another example, with reference to FIG. 7, the computer or server 122 described with reference to FIG. 1 may be one or more controller 702 or include the one or more controller 702 connected to the driving mechanisms 115 to 121 of FIG. 1. An example of such controller may be one of the NJ series industrial automation controller (also called Robotics Central Processing Unit) produced by Omron Corporation. The one or more controller 702 may be configured for data/signal transmission using the Ethernet fieldbus technology (e.g. provided by the EtherCAT Technology Group) or other suitable fieldbus technologies. The one or more controller 702 may be used to control each of the examples of the robotic apparatus described with reference to FIGS. 2 to 5G as well. The one or more controllers 702 execute programs and software that may include those programmed in assembly language or other suitable programming language for the operation of the robotic apparatus 100 of FIG. 1. The programs and software are configured to enable a user or operator to control the driving mechanisms 115 to 121 of FIG. 1. The one or more controller 702 is connected to user interfaces (display screen, button/keypad controls, touchscreen controls and the like) to enable a user or operator to take control of the robotic apparatus 100 of FIG. 1. In the present example, each driving mechanism 115 to 121 is responsible for motion in an axis for linear/translational movement or motion about an axis for rotational movement. The robot movement axes of each driving mechanism 115 to 121 are indicated by reference numerals A0 to A6 respectively. In the present example, each driving mechanism 115 to 121 includes a motor and a motor amplifier controllable by the one or more controller 702 to perform the respective movements required.

In the specification and claims, unless the context clearly indicates otherwise, the term "comprising" has the non-exclusive meaning of the word, In the sense of "including at least" rather than the exclusive meaning in the sense of "consisting only of. The same applies with corresponding grammatical changes to other forms of the word such as "comprise", "comprises" and so on.

While the invention has been described in the present disclosure in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A robotic apparatus comprising:
a first guide rail for guiding movement in two directions;
an elongate support attached to the first guide rail such that the elongate support is movable along the first guide rail in the two directions and rotatable at each position along the first guide rail, wherein the elongate support comprises a second guide rail;
a first limb attached to the second guide rail of the elongate support such that the first limb is movable along the second guide rail, wherein the first limb is extendable and retractable;
a second limb pivotably attached to an end of the first limb such that the second limb is pivotable about the end of the first limb;
an end effector mount located at an end of the second limb such that the end effector mount is rotatable at the end of the second limb; and
a third guide rail attached to the elongate support to guide movement of the elongate support in the two directions that the elongate support is movable along the first guide rail, wherein the elongate support is rotatable at each position along the third guide rail; and
a plurality of driving mechanisms to drive movements of the elongate support, the first limb, the second limb, and the end effector mount,
wherein the rotation of the elongate support at the positions along the first guide rail is driven by one of the plurality of driving mechanisms and the rotation of the elongate support at the positions along the third guide rail is driven separately by another one of the plurality of driving mechanisms,
wherein the driving mechanism driving the rotation of the elongate support at the positions along the first guide rail is configured with stronger drive than the driving mechanism driving the rotation of the elongate support at the positions along the third guide rail.

2. The robotic apparatus as claimed in claim 1, wherein the first guide rail and the third guide rail are attached to each other through a support.

3. The robotic apparatus as claimed in claim 2, wherein the movement of the elongate support along the first guide rail is driven by one of the plurality of driving mechanisms and the movement of the elongate support along the third guide rail is driven separately by another one of the plurality of driving mechanisms.

4. The robotic apparatus as claimed in claim 2, wherein the robotic apparatus has dimensions to fit within a footprint of length 0.5 m to 10 m, width 0.1 m to 1 m and height 0.5 m to 3 m.

5. The robotic apparatus as claimed in claim 2, wherein an end effector attached to the end effector mount is able to reach within a working space of length 1 m, width 1 m and height 1 m around a part of the robotic apparatus.

6. The robotic apparatus as claimed in claim 2, wherein the first limb is attached to the second guide rail of the elongate support such that pivoting movement of the second limb in at least one direction is not obstructed by the elongate support.

7. The robotic apparatus as claimed in claim 2, wherein the elongate support is rotatable at each position along the first guide rail to an angle such that the first limb and/or the second limb, when extended, do not extend beyond a restricted working space around a part of the robotic apparatus, wherein the restricted working space is defined as a predetermined dimension with respect to the part of the robotic apparatus.

8. The robotic apparatus as claimed in claim 2, wherein the elongate support is rotatable at each position along the first guide rail to an angle such that the first limb and the second limb including the end effector mount with or without an end effector mounted to the end effector mount, when extended, do not extend beyond a restricted working space around a part of the robotic apparatus, wherein the restricted working space is defined as a predetermined dimension with respect to the part of the robotic apparatus.

9. The robotic apparatus as claimed in claim 1, wherein the movement of the elongate support along the first guide rail is driven by one of the plurality of driving mechanisms and the movement of the elongate support along the third guide rail is driven separately by another one of the plurality of driving mechanisms.

10. The robotic apparatus as claimed in claim 1, wherein the driving mechanism driving the movement of the elongate support along the first guide rail is configured with stronger drive than the driving mechanism driving the movement of the elongate support along the third guide rail.

11. The robotic apparatus as claimed in claim 1, wherein the robotic apparatus has dimensions to fit within a footprint of length 0.5 m to 10 m, width 0.1 m to 1 m and height 0.5 m to 3 m.

12. The robotic apparatus as claimed in claim 1, wherein an end effector attached to the end effector mount is able to reach within a working space of length 1 m, width 1 m in and height 1 m around a part of the robotic apparatus.

13. The robotic apparatus as claimed in claim 1, wherein the first limb is attached to the second guide rail of the elongate support such that pivoting movement of the second limb in at least one direction is not obstructed by the elongate support.

14. The robotic apparatus as claimed in claim 1, wherein the elongate support is rotatable at each position along the first guide rail to an angle such that the first limb and/or the second limb, when extended, do not extend beyond a restricted working space around a part of the robotic apparatus, wherein the restricted working space is defined as a predetermined dimension with respect to the part of the robotic apparatus.

15. The robotic apparatus as claimed in claim 1, wherein the elongate support is rotatable at each position along the first guide rail to an angle such that the first limb and the second limb including the end effector mount with or without an end effector mounted to the end effector mount, when extended, do not extend beyond a restricted working space around a part of the robotic apparatus, wherein the restricted working space is defined as a predetermined dimension with respect to the part of the robotic apparatus.

* * * * *